(12) United States Patent
Decker

(10) Patent No.: US 10,738,937 B2
(45) Date of Patent: Aug. 11, 2020

(54) PORTABLE SHOOTING STAND

(71) Applicant: Edward J. Decker, Dickinson, ND (US)

(72) Inventor: Edward J. Decker, Dickinson, ND (US)

( * ) Notice: Subject to any disclaimer, the term of this patent is extended or adjusted under 35 U.S.C. 154(b) by 0 days.

(21) Appl. No.: 16/107,255

(22) Filed: Aug. 21, 2018

(65) Prior Publication Data

US 2019/0056060 A1   Feb. 21, 2019

Related U.S. Application Data

(60) Provisional application No. 62/548,091, filed on Aug. 21, 2017.

(51) Int. Cl.
| | |
|---|---|
| *F16M 11/32* | (2006.01) |
| *F41A 23/30* | (2006.01) |
| *F41A 23/60* | (2006.01) |
| *F41A 23/14* | (2006.01) |
| *F41A 23/16* | (2006.01) |
| *A01M 31/02* | (2006.01) |

(52) U.S. Cl.
CPC ............. *F16M 11/32* (2013.01); *F41A 23/14* (2013.01); *F41A 23/16* (2013.01); *F41A 23/30* (2013.01); *F41A 23/60* (2013.01); *A01M 31/02* (2013.01)

(58) Field of Classification Search
CPC ...... F16M 11/32; F16M 11/20; F16M 11/242; F41A 23/14; F41A 23/16; F41A 23/30; F41A 23/60; F41A 23/12; F41A 23/00; F41A 23/005; F41A 23/28; A01M 31/02; A47B 3/02

USPC ........... 297/331, 335, 159.1, 215.13, 215.15; 248/218.4–219.4, 166, 129, 434, 435, 248/168–170; 42/94
See application file for complete search history.

(56) References Cited

U.S. PATENT DOCUMENTS

| | | | | | |
|---|---|---|---|---|---|
| 3,863,945 | A | * | 2/1975 | Dunstan ................. | F16M 11/42 280/35 |
| 4,183,579 | A | * | 1/1980 | Gonzalez y. Rojas ..................... | A47C 9/025 248/171 |
| 4,884,842 | A | * | 12/1989 | Finkelstein .............. | A47C 9/06 297/331 |
| 4,932,719 | A | * | 6/1990 | Gonzalez y. Rojas ..................... | A47C 7/029 297/338 |
| 5,124,857 | A | * | 6/1992 | Pitz ...................... | G02B 7/1824 248/170 |
| 5,137,236 | A | * | 8/1992 | Burns ..................... | B41J 29/06 248/169 |
| 5,833,308 | A | * | 11/1998 | Strong, III ............. | B60N 3/007 297/172 |

(Continued)

*Primary Examiner* — Christopher Garft
(74) *Attorney, Agent, or Firm* — Brannen Law Office, LLC

(57) ABSTRACT

A shooting stand for supporting a user and a gun thereon includes a center post, a plurality of legs extending outwardly from a bottom end of the post, a gun support at the top end of the center post to support the gun, and a seat assembly supported on the center post at an intermediate location between the gun support assembly and the inner ends of the legs which is adapted to support the user thereon. The gun support and the seat assembly are both pivotal about an upright axis of the center post relative to the legs. The gun support, the seat assembly and the legs are all foldable into a collapsed position extending generally alongside the center post for ease of transport and storage.

19 Claims, 6 Drawing Sheets

(56) References Cited

U.S. PATENT DOCUMENTS

| | | | | |
|---|---|---|---|---|
| 5,913,668 | A | * | 6/1999 | Messer .................. F41A 23/16 |
| | | | | 42/94 |
| 6,044,747 | A | * | 4/2000 | Felts ...................... F41A 23/14 |
| | | | | 42/94 |
| 6,058,641 | A | * | 5/2000 | Vecqueray ............. F41A 23/12 |
| | | | | 248/425 |
| 6,269,578 | B1 | * | 8/2001 | Callegari ................ F41A 23/02 |
| | | | | 297/172 |
| 6,895,709 | B1 | * | 5/2005 | Krien .................... A47B 83/02 |
| | | | | 42/94 |
| 7,168,199 | B2 | | 1/2007 | Krien et al. |
| 7,281,347 | B2 | | 10/2007 | Carpenter |
| 7,730,824 | B1 | * | 6/2010 | Black ..................... F41A 23/16 |
| | | | | 42/94 |
| 7,731,278 | B1 | * | 6/2010 | Brownlee ............... F41C 27/22 |
| | | | | 248/170 |
| 8,123,180 | B2 | | 2/2012 | Shipman et al. |
| 9,341,427 | B2 | | 5/2016 | Bricko et al. |
| 2007/0169391 | A1 | * | 7/2007 | Carpenter ............... F41A 23/14 |
| | | | | 42/94 |
| 2008/0283692 | A1 | * | 11/2008 | Leinen ................. A61M 5/1415 |
| | | | | 248/125.8 |
| 2009/0113779 | A1 | * | 5/2009 | Shipman ................ F16M 11/10 |
| | | | | 42/94 |
| 2016/0003571 | A1 | | 1/2016 | Kleinfelder |

\* cited by examiner

PORTABLE SHOOTING STAND

This application claims the benefit under 35 U.S.C. 119(e) of U.S. provisional application Ser. No. 62/548,091, filed Aug. 21, 2017.

FIELD OF THE INVENTION

The present invention relates to a portable shooting stand having a center post carrying a seat for a user to sit on and a gun support arm to support a gun of the user thereon, and legs to support the center post in an upright orientation, in which the seat, the gun support arm and the legs are collapsible relative to the center post for portability in a collapsed position.

BACKGROUND

Use of a shooting stand to support a user thereon in a seated position and to further provide a supporting structure upon which a firearm may be supported is known in various forms. Examples are disclosed in U.S. Pat. No. 9,341,427 by Bricko et al, U.S. Pat. No. 7,168,199 by Krien et al, and U.S. Pat. No. 7,281,347 by Carpenter, as well as in US patent publication 2016/0003571 by Kleinfelder. Currently available shooting stands may provide limited adjustability, may not be well suited for collapsing into a compact form for portability, may require considerable manipulation by the user to adjust, and/or may provide inadequate support to the user in operation.

The present invention relates to a shooting stand which can be readily collapsed into a portable position while remaining highly adjustable and effective at supporting the user in a deployed position.

SUMMARY OF THE INVENTION

According to one aspect of the invention there is provided a shooting stand for supporting a user and a gun thereon, the shooting stand comprising:

a center post having a longitudinal axis extending between a bottom end of the center post and an opposing top end of the center post;

a plurality of legs extending longitudinally between respective inner ends of the legs pivotally coupled to the center post adjacent the bottom end of the center post and respective outer ends of the legs;

the legs being pivotal between a collapsed position extending upwardly from the inner ends alongside the center post and an extended position extending radially outwardly from the center post at a downward slope towards the outer ends which are adapted to be supported on a ground surface;

a gun support assembly supported on the center post in proximity to the top end of the center post which is adapted to support the gun thereon;

the gun support assembly being pivotal relative to the legs about the longitudinal axis of the center post;

a seat assembly supported on the center post at an intermediate location between the gun support assembly and the inner ends of the legs which is adapted to support the user thereon; and the seat assembly being pivotal relative to the legs about the longitudinal axis of the center post.

The shooting stand may further comprise a pair of wheels supported on the shooting stand which are adapted to support the shooting stand for rolling movement along the ground surface in the collapsed position of the legs and which are supported spaced above the ground surface by the legs in the extended position of the legs. Preferably the pair of wheels are spaced apart in a circumferential direction of the center post at opposing sides of one of the legs. The wheels may be fixed in location relative to the center post or may be adjustable in width relative to the center post.

Preferably the pair of wheels are adapted to support the shooting stand for rolling movement along the ground surface when said one of the legs between the pair of wheels is in the collapsed position while the other legs remain in the extended position.

The plurality of legs may comprise three legs which are spaced apart evenly from one another in the circumferential direction, in which the seat is adapted to be received circumferentially between two of the legs in the collapsed position thereof at a location diametrically opposite from the other leg which is received circumferentially between the pair of wheels.

The shooting stand may further include a hinged brace associated with each leg respectively to selectively retain the leg in the extending position, in which each hinged brace comprises a first link pivotally coupled to the respective leg at an intermediate location on the leg and a second link pivotally coupled to each of the center post and the first link, and in which the first and second links of each leg are folded alongside one another in the collapsed position of the leg and are joined end to end with one another under compression in the extended position of the leg.

The intermediate location of the first link may be adjustable along the respective leg on at least two of the legs.

The seat assembly may comprise a seat adapted to receive the user seated thereon, a seat collar supported for rotation about the center post and a seat support member upon which the seat is mounted and which is pivotally coupled to seat collar such that the seat is movable with the seat support member relative to the seat collar between a collapsed position of the seat in which the seat support member extends alongside the center post and an extended position of the seat in which the seat support member is supported to extend radially outward from the center post.

Preferably a first latching element is arranged to selectively retain the seat in the extended position and a second latching element is arranged to selectively retain the seat in the stored position. The seat may be received between two of the legs in the collapsed position of both the seat and the legs.

A carrying handle may be mounted on the seat support member so as to protrude away from the centre post in the collapsed position of the seat and such that the carrying handle is longitudinally centered relative to the center post in the collapsed position of the seat.

A shelf may be supported seat support member so as to be movable with the seat member relative to the center post, in which the shelf has an upper supporting surface lying perpendicularly to the center post.

The center post may further comprises (i) a lower section formed by a bottom sleeve at a bottom end of the post upon which the legs are pivotally supported; and (ii) an upper section longitudinally slidable within the bottom sleeve of the lower section upon which the gun support assembly is supported such that the gun support assembly is adjustable in height relative to the legs by longitudinally sliding the upper section relative to the lower section.

Preferably the seat assembly is supported on the lower section such that the gun support assembly is adjustable in height relative to the seat assembly by longitudinally sliding the upper section relative to the lower section.

The gun support assembly preferably comprises (i) a gun support arm coupled to the bracket so as to be pivotal with the bracket relative to the center post between a collapsed position of the gun support arm alongside the center post and an extended position of the gun support arm extending radially outward from the center post; and (ii) a gun support cradle supported on the gun support arm which is adapted to receive the gun of the user cradled therein and which is adjustable in location along the gun support arm.

A user arm support member may also be mountable on the gun support arm (i) in an extended position to extend radially outward from the center post diametrically opposite the gun support arm in the extended position of the gun support arm and (ii) in a collapsed position extending alongside the gun support arm in the collapsed position of the gun support arm.

The user arm supporting member is preferably mountable on the gun support arm in a first extended position offset laterally towards a first side of the gun support arm and in a second extended position offset laterally towards a second side of the gun support arm opposite the first side.

The gun support cradle may be mountable on the gun support arm in a first position offset laterally towards a first side of the gun support arm and in a second position offset laterally towards a second side of the gun support arm opposite the first side.

A brace member may be operatively connected between the gun support member and the center post in the extended position of the gun support member which includes a screw member arranged such that rotation of the screw member about a longitudinal axis of the screw member will vary an effective length of the brace member to vary an angular orientation of the gun support member relative to the longitudinal axis of the center post.

BRIEF DESCRIPTION OF THE DRAWINGS

Some embodiments of the invention will now be described in conjunction with the accompanying drawings in which.

In the drawings like characters of reference indicate corresponding parts in the different figures.

DETAILED DESCRIPTION

Figure 1:
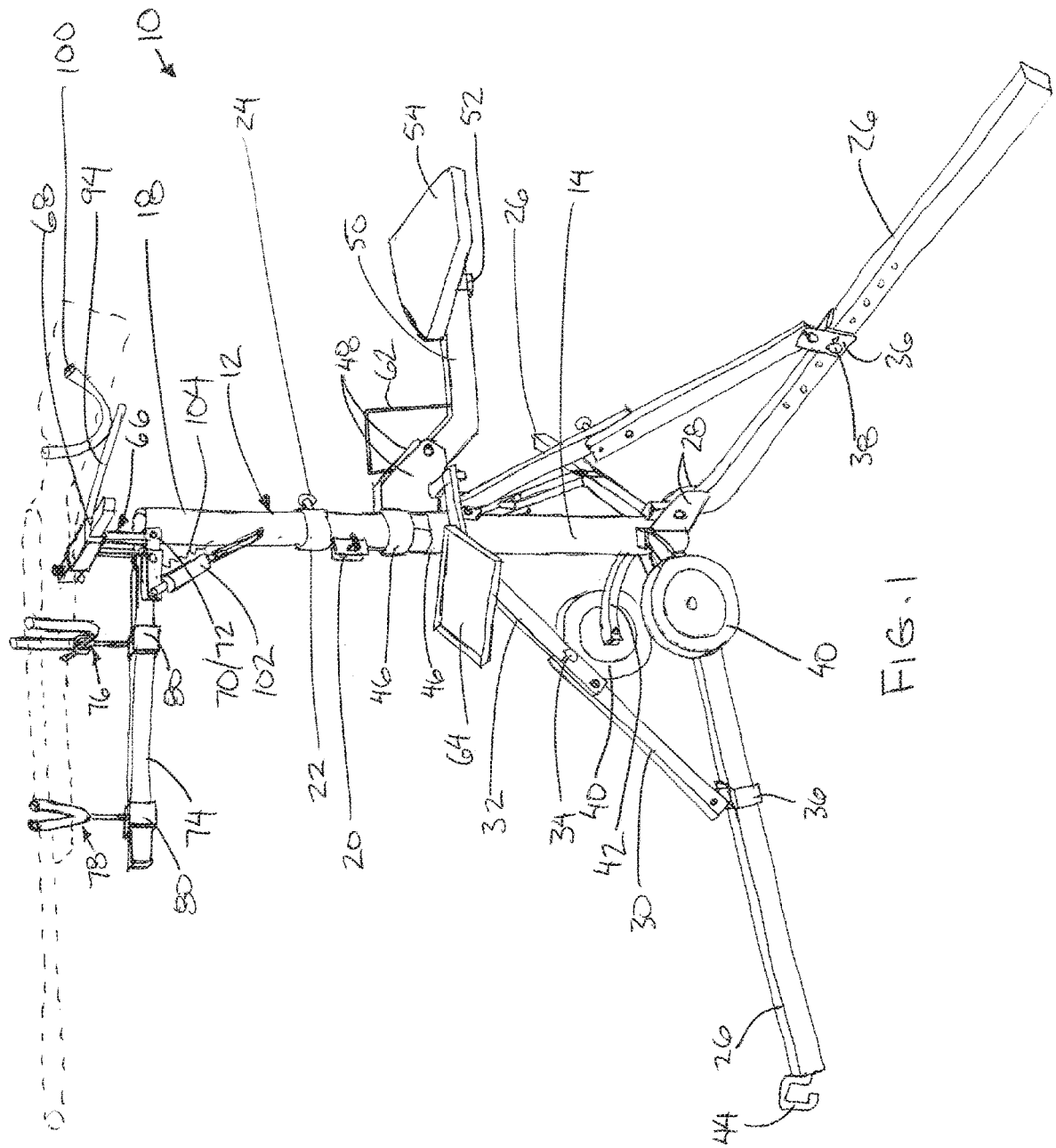
FIG. 1 is a perspective view of the shooting stand according to a first embodiment in a deployed configuration with the various components of the shooting stand shown in the extended position thereof.

Referring to the accompanying figures there is illustrated a shooting stand 10 for supporting a user in a seated position thereon, and for also supporting a gun of the user in a shooting position when the shooting stand is deployed for use. The various components of the shooting stand as described in the following are movable between an extended state in which the shooting stand can be adjustably supported on a ground surface to support the user and the gun thereon, and a collapsed state in which the various components of the shooting stand are folded inwardly to reduce the overall size of the shooting stand into a more compact form suitable for portability and for rolling along the ground surface.

Although various embodiments are shown in the accompany features, the first embodiment of the shooting stand according to FIGS. 1 through 6 will first be described.

The shooting stand 10 includes a centre post 12 having a longitudinal axis extending from a bottom end to a top end of the centre post. The centre post includes a lower section 14 defined by a sleeve at the bottom end of the center post and an upper section 18 in the form of a tube which is longitudinally slidable into the lower sleeve of the lower section 14 of the centre post. The upper section 18 protrudes upwardly through the open top end of the lower section 14 to define the top end of the center post, and is longitudinally slidable to adjust the overall height of the centre post.

The lower section 14 includes an annular flange 16 fixed to protrude radially outward from an outer surface thereof at an intermediate location along the height of the lower section 14 to define a leg supporting portion below the flange 16 and a seat supporting portion above the flange 16. The seat supporting portion of the lower section 14 above the flange 16 is slotted along an upper end portion thereof to generally define a C-clamp 20 having a pair of end flanges circumferentially spaced apart on opposing sides of the slot with a suitable fastener connected therebetween enabling the upper end portion of the seat supporting portion of the lower section 14 of the center post to be circumferentially clamped about the upper section 18 of the center post received therein to selectively fix the upper section longitudinally and against rotation relative to the lower section. Varying the tightness of the C-clamp 20 also varies the amount of frictional resistance applied by the clamp against rotation of the upper section 18 relative to the lower section 14 as described in further detail below.

A locking collar 22 of similar diameter to the lower section is supported at the top end of the lower section 14 of the center post to also receive the upper section 18 longitudinally slidable therein, while remaining rotatable relative to the lower section. A latch pin 24 is selectively received through an aperture in the collar 22 at a selected one of a plurality of cooperating apertures in the tube of the upper section 18 to selectively fix the height of the upper section relative to the locking collar 22 in an adjustable manner. The latch pin includes a spring which biases the latch pin inwardly into an engage position into a selected one of the apertures in the upper section of the centre post. By locking the upper section 18 to the locking collar 22, with the collar 22 engaged upon the top end of the lower section 14, the upper section is held at a minimum height by the collar. The collar 22 is merely abutted against the top end of the lower section 14 of the center post to allow the collar 22 to be displaced upwardly relative to the lower section 14 together with the upper section 18 when the collar 22 is locked by the latch pin 24 to the upper section 18.

A set of three legs 26 are coupled to the leg supporting portion of the lower section 14 at the bottom of the post 12, at evenly spaced apart positions in the circumferential direction about the post. Each leg extends along a respective longitudinal axis from an inner end pivotally coupled to the centre post to an opposing outer end adapted to be engaged on the ground surface in the deployed state of the shooting stand. A pair of parallel plates 28 protrude radially outwardly parallel and spaced apart from one another at the mounting location of each leg 26 to receive a pivot pin between the two plates 28 which extends through the inner end of the respective leg to form the pivotal connection of the leg to the post.

Each leg is pivotal from a collapsed position to an extended position. In the collapsed position, the leg extends upwardly, parallel and alongside the centre post from the inner end of the leg at the bottom end of the post to the opposing outer end of the leg. In the extended position, each leg extends radially outward from the centre post at a downward slope so as to support the bottom end of the post spaced above the ground surface upon which the outer ends of the legs are engaged.

Each leg is selectively retained in the extended position by a hinged brace having a first link 30 and a second link 32. The first link 30 is pivotally coupled at a first end at an intermediate location on the respective leg. The second link 32 is pivotally coupled at a first end to the second end of the respective first link 30 and is coupled at a second end of the second link to the central post adjacent a top end of the lower section 14 of the post. The brace is foldable as the leg is pivoted to the collapsed position such that in the collapsed position the first and second links extend generally alongside one another to be in a near parallel relationship alongside the post and the corresponding leg. In the extended position, the first and second links are substantially co-linear with one another in an end to end configuration. A latch pin 34 is operatively connected between the first and second links at a location spaced radially from the central pivot between the first and second links so as to selectively retain the braces in the extended position when the latch pin 34 is engaged through cooperating apertures in the two links respectively.

On two of the three legs 26, the first link 30 of the respective brace is pivotally coupled on a collar 36 which is supported for longitudinal sliding along the leg such that the intermediate pivot location of the brace on the leg is adjustable along the leg. A latch pin 38 is mounted on the caller 36 for cooperation with corresponding apertures in the collar 36 and along the respective leg to selectively latch the brace at a selected intermediate location along the leg. By adjusting the longitudinal position of the anchoring location of two of the braces, the overall height of the outer ends of all three legs can be adjusted relative to one another for leveling the shooting stand when the outer ends are engaged upon an irregular ground surface.

Two wheels 40 are provided for supporting the shooting stand thereon for rolling movement along the ground surface in the collapsed position. Each wheel 40 is supported on a respective support arm 42 extending generally radially outward from the centre post adjacent the bottom end thereof. The two wheels 40 are supported to be spaced apart in the circumferential direction of the post relative to one another while being rotatable about a common wheel axis lying generally tangentially to the centre post. The wheels are positioned to receive one of the legs 26 centred in the circumferential direction therebetween. The wheels protrude radially outward from the centre post by an amount greater than the corresponding leg 26 therebetween when the leg is in the collapsed position such that the wheels are unobstructed for engaging the ground to support the bottom end of the shooting stand for rolling along the ground when the centre post is oriented horizontally or at a slight upward slope from the bottom end thereof relative to the ground. The elevation of the wheels relative to the centre post is such that the wheels are held spaced above the ground by the legs in the extended position of the legs. A handle 44 is provided at the outer end of the leg 26 that is received between the two wheels 40 so as to provide a suitable handle for gripping in the hand of the user near the top end of the centre post in the collapsed position of the shooting stand.

A seat assembly for supporting the user in a seated position thereon includes two seat collars 46 which are supported for rotation about the seat supporting portion of the lower section 14 of the centre post at longitudinally spaced positions relative to one another for rotation relative to the centre post. The seat collars 46 have an inner diameter which is longitudinally slidable on and rotatable on the outer diameter of the lower section 14 upon which they are supported. The collars are mounted overtop of the top end of the lower section 14 of the center post during assembly so that a lowermost one of the collars 46 is engaged upon a top side of the annular flange 16 which supports the seat assembly at a prescribed elevation relative to the lower section of the center post. A seat bracket is fixedly joined between the two seat collars to form a common seat frame in which the seat bracket is comprised of two parallel plates 48 mounted parallel and spaced apart from one another to project generally radially outward from the centre post. The end flanges of the C-clamp are welded onto the sleeve forming the lower section 14 of the center post subsequent to the seat collars 46 being positioned on the post such that the seat collars forming the common seat frame are subsequent retained on the lower section 14 of the center post between the annular flange 16 below and the C-clamp 20 above.

A seat support member 50 in the form of an elongate rigid beam extending longitudinally between an inner end and an outer end, is pivotally mounted at an inner end between the two parallel plates 48. A collar 52 is supported for longitudinal sliding along the seat support member and supports a seat panel 54 thereon having an upper supporting surface upon which a user may be seated in the extended position of the seat assembly.

A latch pin 56 is supported on the collar 52 for operative connection between an aperture on the collar 52 and a selected one of a plurality of cooperating apertures along the seat support member. In this manner the latch pin 56 serves to selectively retain the seat 54 at any one of a plurality of longitudinally spaced mounting locations along the seat support member.

The seat support member 50 is generally pivotal between an extended position and a collapsed position. In the extended position the seat support member extends generally radially outward from the centre post so that the upper supporting surface of the seat 54 is generally perpendicular to a longitudinal axis of the centre post so as to be rotatable about a full 360° together with the seat collars 46 relative to the centre post. An inner end portion of the seat support member extends at a downward and radially outward slope from the pivotal connection to the centre post at a slope corresponding approximately to the slope of the braces so that there is no interference between the seat support member and the braces during relative rotation therebetween despite the seat 54 being lower in elevation than the upper pivotal connection of the leg braces to the centre post. In the collapsed position, the seat support member extends generally parallel to, and downwardly alongside the centre post from the inner end pivotally coupled to the centre post. The seat is typically positioned in the circumferential direction between two of the legs 26 at a location diametrically opposite from the wheels 40 so as to be nested between the legs in the collapsed position.

To retain the seat assembly in the extended position, a first latching element 58 is provided in the form of a first latch pin on one of the plates 48 of the seat bracket for cooperation with a corresponding cooperating aperture in the seat support member which are aligned with one another in the extended position. Similarly to retain the seat support member latched in the collapsed position, and a second latching element 60 is provided in the form of a second latch pin which selectively mates with a corresponding aperture in the seat support member which are aligned in the collapsed position.

A carry handle 62 protrudes generally radially outward from the support member away from the centre post when the seat support member extends alongside the post in the collapsed position. The carry handle 62 is located near the inner end of the seat support member so as to be approximately centred in the longitudinal direction of the centre post when the seat support member is folded into the collapsed position.

A support shelf 64 is supported on a corresponding support arm which is rigidly attached to the plates 48 of the seat bracket for rotation together with the seat assembly about the centre post. The support shelf 64 includes an upper supporting surface lying generally perpendicular to the post axis for supporting accessories thereon, for example ammunition.

A gun support assembly is provided at the top end of the centre post for supporting the gun thereon. The assembly includes a pivot frame which is pivotally coupled at the top end of the post about an axis lying perpendicular to the longitudinal axis of the centre post. A first frame portion 66 of the pivot frame comprises two posts and a crossbar connected between the posts within a common plane so that the posts are generally upright and parallel to the centre post in the extended position of the support assembly by hinging the bottom end of the two posts at opposing sides of the centre post. The first frame portion 66 further includes a support sleeve 68 spanning across the top ends of the two posts which includes a sleeve of resilient material formed thereon to form a portion of a gun rest upon which the gun may be supported.

The gun support assembly also includes a second frame portion 70 of the pivot frame which is fixed in perpendicular relationship to the first frame portion 66. The second frame portion includes two arms 72 which are parallel to one another and mounted to project perpendicularly outward from the bottom ends of the two posts of the first frame portion 66 such that the two arms 72 are generally horizontal when the first frame portion is vertical.

A gun support member 74 in the form of an elongate rigid tube is releasably mounted to either one of the arms 72 of the second frame portion by telescoping the tube of the gun support member relative to the selected arm 72 with a transverse fastener being received therethrough to fix the gun support member relative to the selected arm 72. In this manner the gun support member 74 is pivotal with the pivot frame relative to the centre post between a collapsed position extending generally downwardly alongside the centre post from the top end thereof to an extended position extending generally radially outward from the top end of the centre post.

Figure 2:
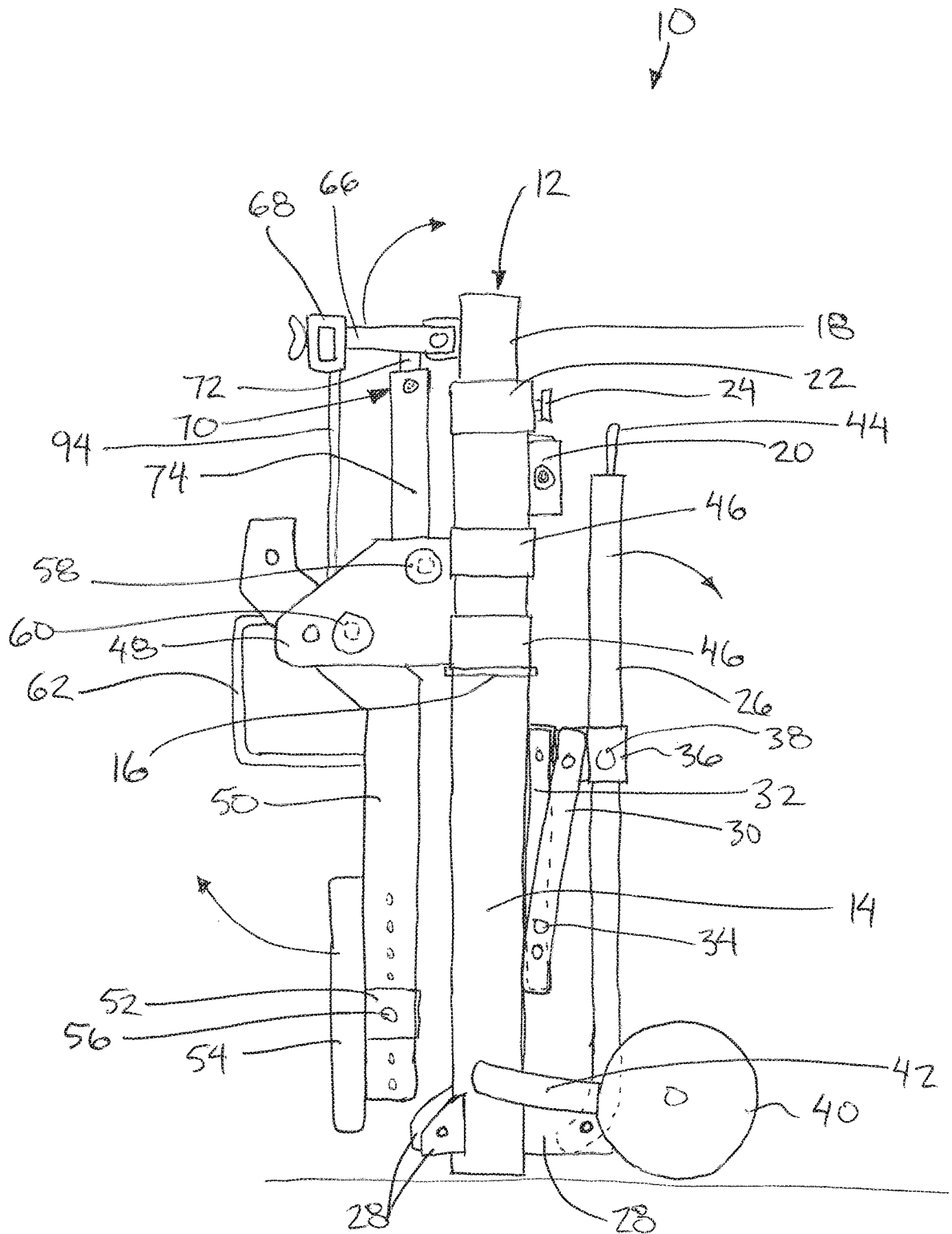
FIG. 2 is a side elevational schematic representation of the shooting stand according to the first embodiment of FIG. 1 in a collapsed position with two of the legs shown removed for illustrative purposes.
Figure 3:
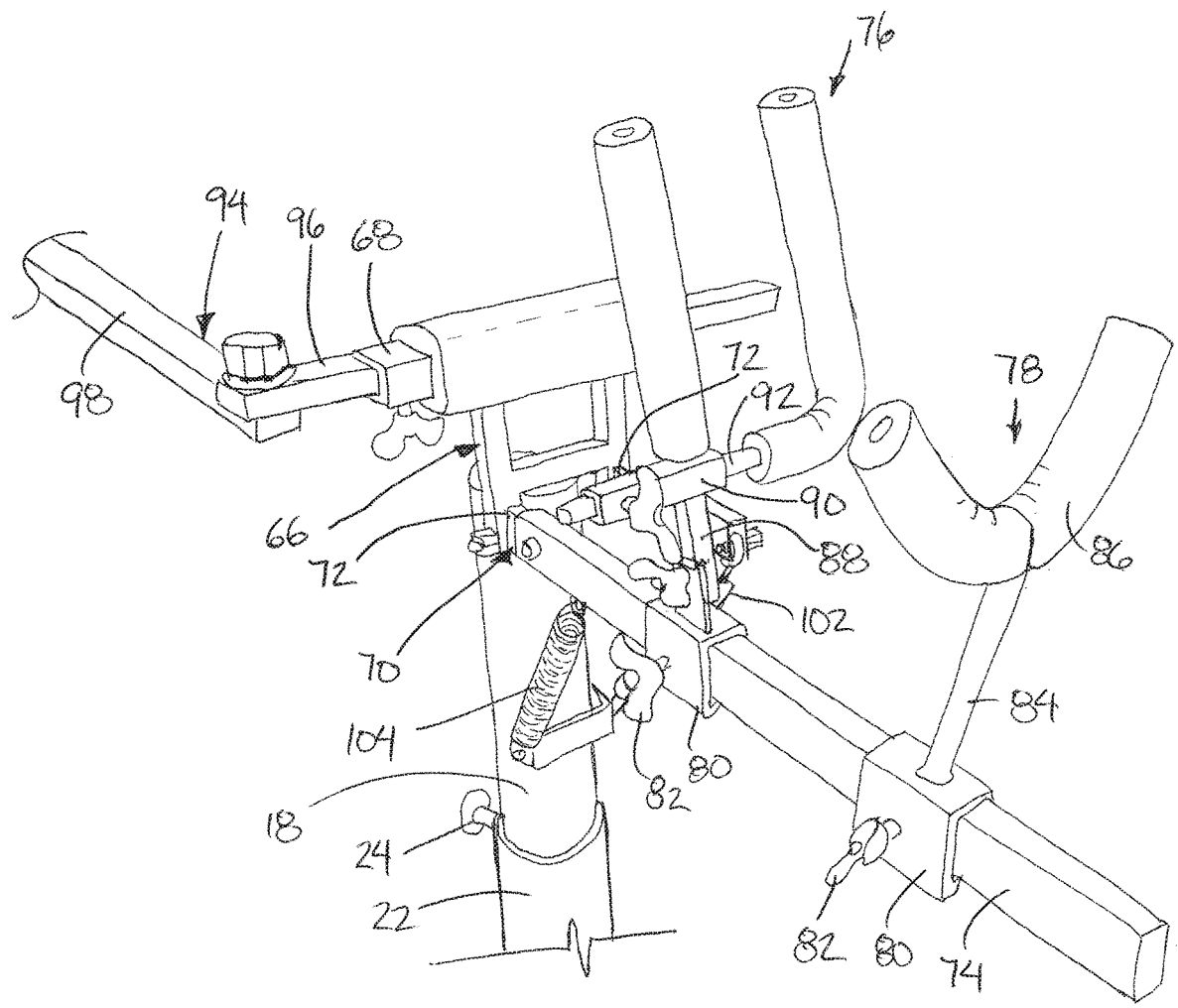
FIG. 3 is a perspective view of the gun support assembly at the top end of the shooting stand according to the first embodiment of FIG. 1 in the extended position thereof.

An inner gun cradle 76 and an outer gun cradle 78 are provided on the gun support member 74 for longitudinally sliding thereon by use of a respective mounting collar 80 which is longitudinally slidable along the gun support member. A suitable set screw 82 on each collar 80 retains the respective gun cradle at a selected longitudinal position along the gun support member. The inner and outer gun cradles are thus pivotal together with the gun support arm between the extended position as shown in FIG. 1 in which the inner and outer gun support cradles are seen supported at different distances along the gun support arm from the center post in the same direction along the gun support arm from the center post, and the collapsed position as shown in FIG. 2 in which the entirety of the gun support arm 74 that supports both the inner and outer gun support cradles thereon is seen below a top end of the center post.

The outer gun cradle 78 that is located farthest from the centre post includes an offset arm 84 extending generally upwardly and laterally offset to one side of the gun support member in the extended position. A cradle portion 86 is mounted at the outer end of the offset arm in the form of a generally U-shaped bar with resilient padded material thereon which receives a portion of the gun cradled therein in operation.

The inner gun cradle 76 that is located closest to the centre post includes a first arm 88 extending generally upward, perpendicular to the gun support member in the extended position of the gun support member. Resilient padded material is provided on the upper portion of the first arm 88 for clamping against one side of the gun to be supported therein. A mounting collar 90 is fixed at an intermediate location along the first arm 88 to be oriented perpendicularly to the first arm. A second arm 92 includes a lower portion which is longitudinally slidable within the collar 90 and an upper portion oriented perpendicularly to the lower portion so as to be generally parallel to the first arm 88 at an adjustable spacing relative to the first arm by the sliding of the lower portion of the second arm 92 within the collar 90. Resilient material is provided on both the lower portion and the upper portion of the second arm 92 so that the second arm and the first arm together form a generally U-shaped cradle receiving a portion of the gun therein but in an adjustable manner for partially clamping various width of guns between the two arms. A set screw is used to fix the location of the lower portion of the second arm 92 relative to the collar 90.

Figure 4:
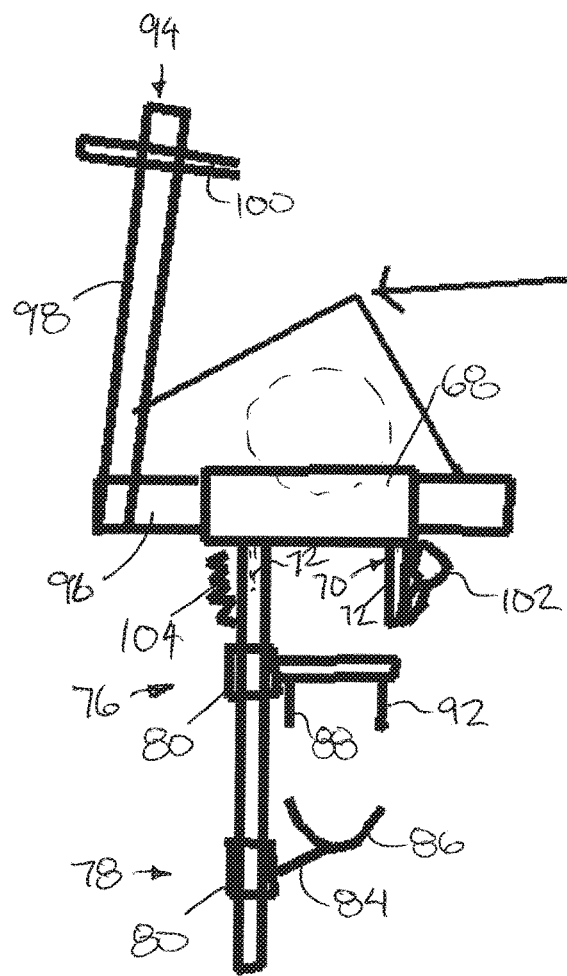
FIG. 4 and FIG. 5 are top plan views of the gun support assembly in the right-hand and left-hand configurations respectively according to the first embodiment of the shooting stand of FIG. 1.
Figure 5:
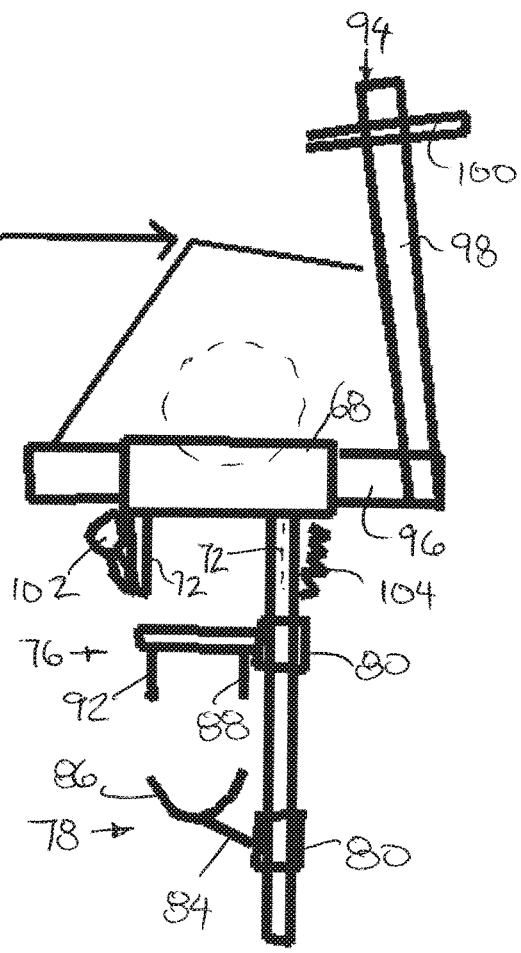

As shown in the top views of FIGS. 4 and 5, the collars 80 which mount the inner and outer gun cradles on the gun support member are reversible to enable the corresponding cradles defined by the inner and outer cradles to be offset to either left or right laterally opposing sides of the gun support member.

The gun support assembly further includes a user arm supporting member 94 having a first arm 96 longitudinally slidable within the support sleeve 68 of the pivot frame. A second arm 98 of the user arm supporting member 94 is hinged at an inner end thereof at one end of the first arm 96 so as to be positionable generally perpendicular relative to the first arm in a common plane lying transversely or near perpendicular to the longitudinal axis of the centre post in the extended position. The second arm 98 thus extends generally radially outward from the centre post at a location diametrically opposite from the gun support member 74 in the extended positions thereof.

The hinge between the first and second arms 96 and 98 however permits the second arm to be pivoted into a collapsed position extending generally parallel alongside the gun support member in the same radial direction from the centre post. When the shooting stand is fully collapsed, both the second arm 98 of the user arm supporting member 94 and the gun supporting member 74 are thus oriented to extend generally downwardly, parallel alongside the centre post from the top end of the centre post. A generally U-shaped arm cradle 100 is mounted at the second end of the second arm 98 opposite the hinge coupled to the first arm 96 to provide a suitable cradle receiving a portion of the arm of the user therein in a shooting position. A bolt at the hinge between the first and second arms can be loosened or tightened to selectively fix the angular orientation of the second arm 98 relative to the first arm 96.

As shown in FIGS. 4 and 5, the orientation of the first arm 96 within the support sleeve 68 can be reversed so that the second arm 98 can be positioned offset in the lateral direction to either the left or right sides of the pivot frame and the gun support member 74 supported thereon. The user arm supporting member 94 can thus be located in a first extended position laterally offset to a first side of the gun support member or in a second extended position laterally offset to a second side of the gun support member.

To retain the gun support member in the extended position, a brace member 102 is provided which pivotally mounts at a first end on a pivot location on the centre post spaced below the top end thereof and which pivotally mounts at a second end on to one of the arms 72 of the second frame portion 70 different than the arm 72 supporting the gun support member 74 thereon. In this manner, when the gun support member is mounted to be laterally offset to the right side of the centre post, the brace member 102 is coupled to the other arm 72 offset to the left side of the centre post. Similarly, when the gun support member is mounted to be laterally offset to the left side of the centre post, the brace member 102 is coupled to the other arm 72 offset to the right side of the centre post.

The brace member 102 can be released at one end thereof to enable the gun support member to be freely pivoted into the collapsed position thereof. Alternatively, in the extended position, the brace member is coupled at both ends between the post and the pivot frame of the gun support assembly. The brace member 102 includes a threaded sleeve and a screw member received therein so that rotation of the screw member about a long axis of the screw member relative to the threaded sleeve varies the overall effective length of the brace member, which in turn adjusts the angular orientation of the gun support member relative to the longitudinal axis of the centre post according to user preference. A spring member 104 is coupled between the centre post and the gun support member to maintain tightness in the linkage of the gun support assembly.

In use, the legs are pivoted from a collapsed position to the extended position by pivoting downwardly and radially outward from the centre post. The braces are similarly extended and latched in the extended position using the provided latch pins. The centre post can be levelled into a vertical orientation by adjusting the anchoring locations of the brace members on two of the legs. The seat member can then be unlatched from the collapsed position, pivoted upwardly and radially outward from the centre post to the extended position, and latched in the extended position. Similarly, the gun support member can be pivoted upwardly and radially outwardly from the collapsed position to the extended position thereof followed by reversal of the user arm supporting member 94 from a position alongside the gun support member 74 to a location diametrically opposite from the gun support member. The upper section of the centre post can be telescopically extended to adjust the height of the top end of the post and the height of the gun support member supported thereon relative to the seat and the legs of the stand to a desired height of the user. The latch pin within the collar at the top of the lower section of the centre post serves to retain the upper section of the post at a selected height while the gun support member on the upper section and the seat assembly remain pivotal for rotation about the upright axis of the centre post.

The C-clamp 20 can be used to apply an adjustable amount of frictional resistance to the relative movement between the upper section 18 and the lower section 14 of the center post. This may include fully locking the upper section 18 against rotation and/or longitudinal sliding relative to the lower section 14, or may include applying a small amount of friction to steady the position of the upper section 18 relative to the lower section 14 while still enabling the user to pivot the upper section 18 relative to the lower section 14 by overcoming the frictional resistance of the clamp 20.

The position of the gun support cradles 76 and 78 are adjusted so that the inner and outer cradles receive portions of the barrel of the rifle therein, while the portion of the rifle body immediately forward of the trigger can be rested on the support sleeve 68.

Figure 6:
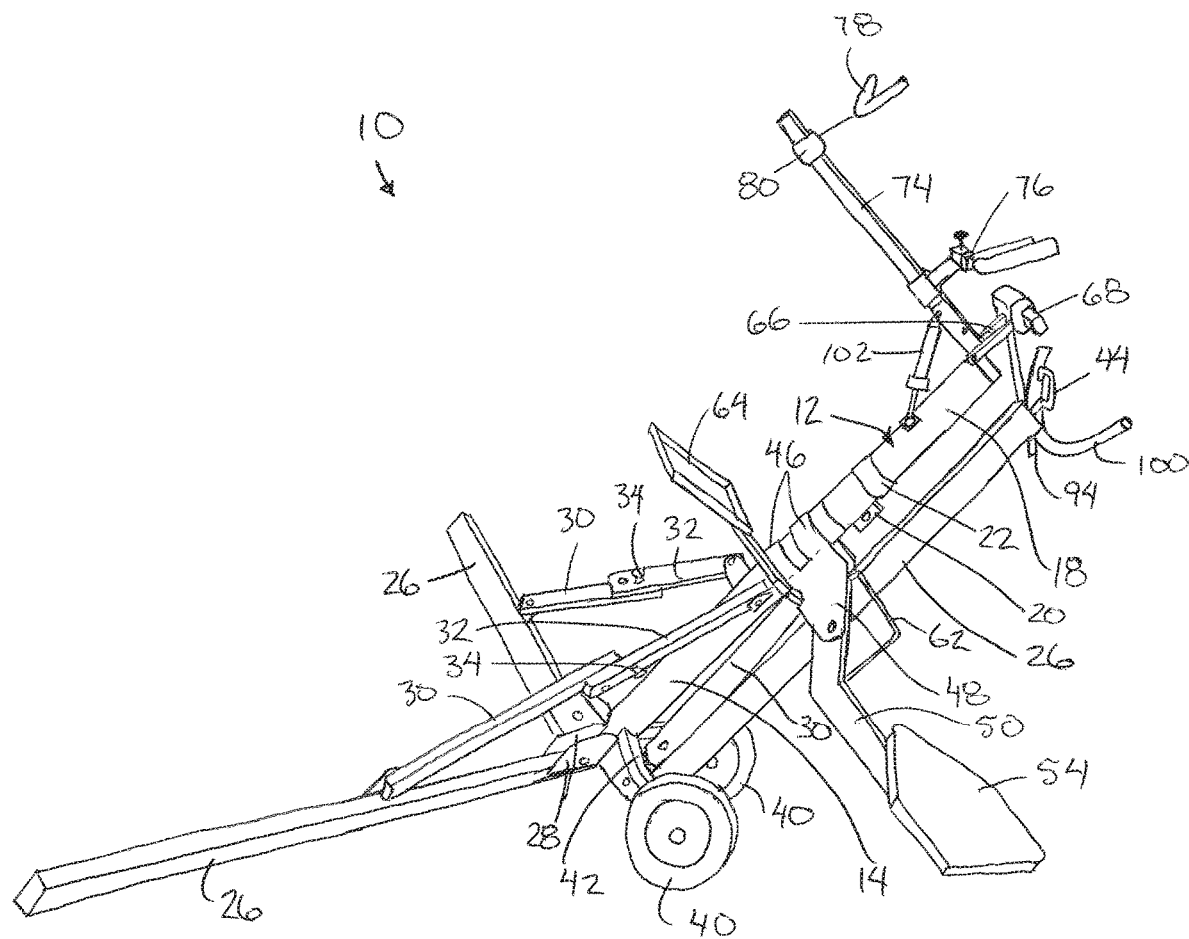
FIG. 6 is a perspective view of the shooting stand according to the first embodiment of FIG. 1 with only one leg collapsed for transporting the stand for rolling on wheels over short distances.

When it is desirable to transport the shooting stand, the user locates the seat to be diametrically opposite the wheels and then collapses the seat into the collapsed position thereof. The user arm supporting member 94 is then pivoted alongside the gun support member, and then both are collapsed alongside the post in proximity to the seat. The legs may then be released from the extended position and pivoted upwardly alongside the post in the collapsed position thereof. In this manner, the wheels remain fixed in position relative to the center post as the legs are movable relative to the wheels between the collapsed position in which the wheels support the shooting stand for rolling movement along the ground surface as shown in FIGS. 2 and 6 and the extended position of the legs in which the wheels are supported spaced above the ground surface and prevented from engaging the ground by the legs as shown in FIG. 1. The user may then grasp the handle 44 at the end of one of the legs to tilt the collapsed shooting stand onto the wheels 40 for rolling movement along the ground. Alternatively, the user may lift the shooting stand using the carry handle 62 by locating the center post in a near horizontal orientation.

When it is desirable to relocate the shooting stand over small distances, it is possible to displace on the leg between the wheels into the collapsed position while the remaining legs remain extended. As shown in FIG. 6, in this instance, tilting the center post towards a more horizontal orientation, or at a slope extending upwardly in a lateral direction towards the wheels will be sufficient for the wheels to engage the ground and support the shooting stand for rolling movement along the ground surface.

Figure 7:
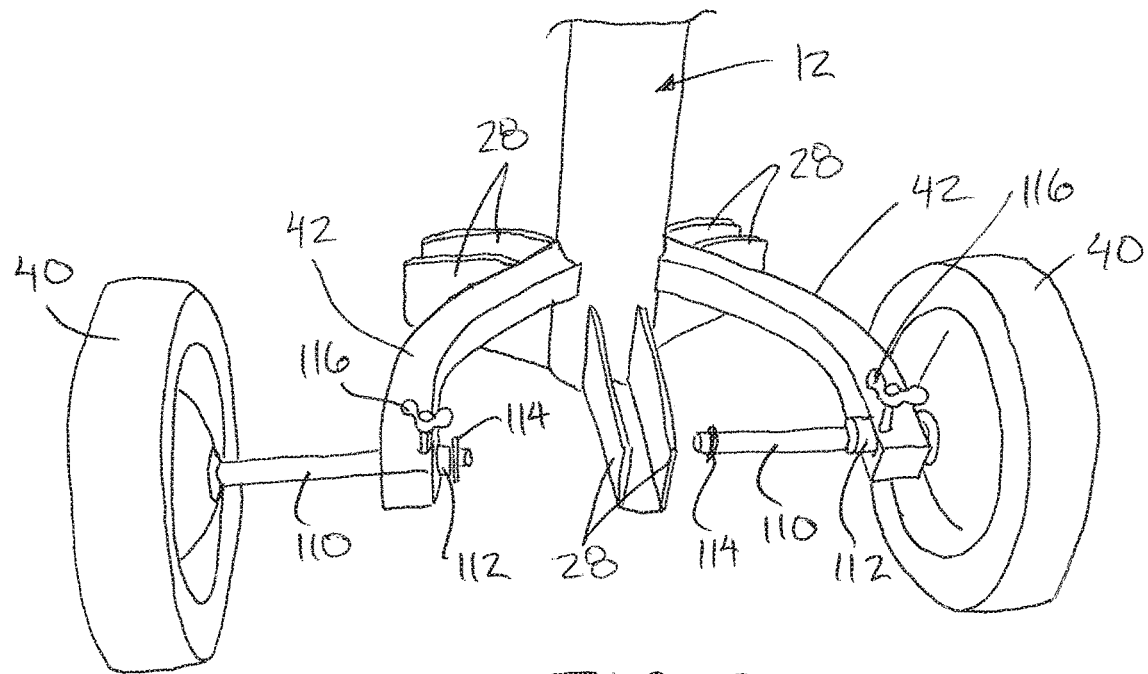
FIG. 7 is a perspective view of the wheels according to a second embodiment of the shooting stand.
Figure 8:
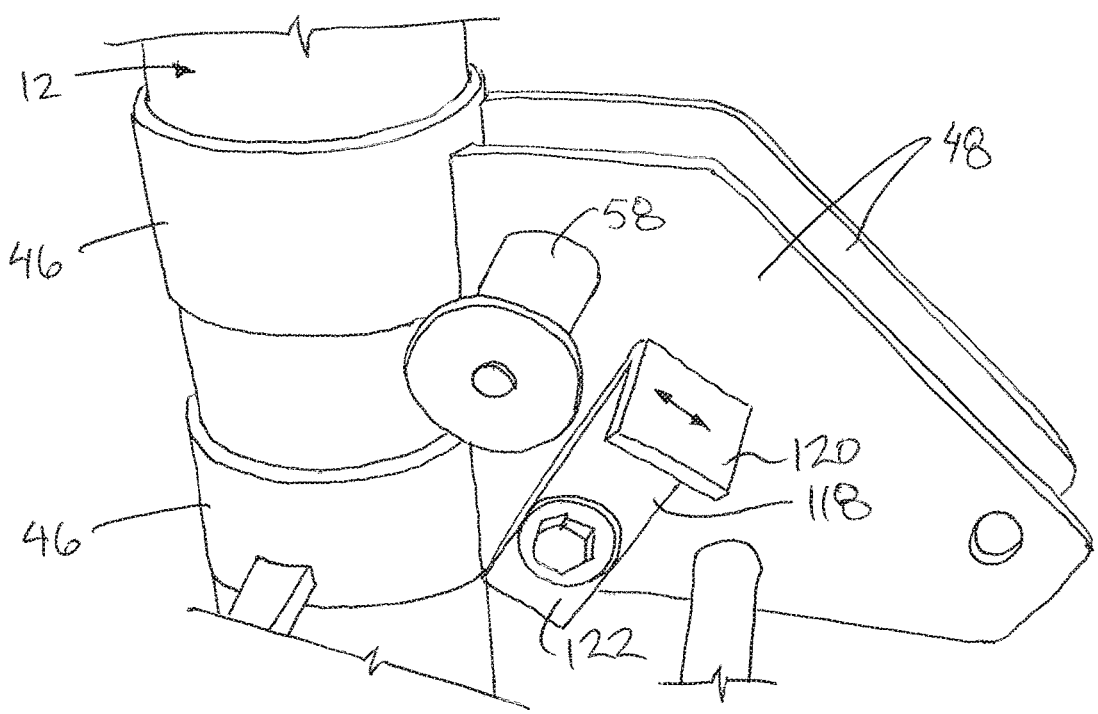
FIG. 8 is a perspective view of a portion of the seat assembly according to a second embodiment of the shooting stand.

Turning now to the second embodiment in FIGS. 7 and 8, the shooting stand is substantially identical to the previous embodiment with the exception of the connection of the wheels 40 to the wheel support arms 42, and the manner of latching the seat 54 in the working seated position or collapsed transport position respectively. As shown in FIG. 7, in this instance, each wheel 40 is rotatably supported on a respective wheel axle 110 which is slidable in an axial direction within a respective bushing 112 mounted to extend through the end of the support arm 42. A snap ring 114 is mounted within a respective groove formed at an inner end of the wheel axle opposite the outer end supporting the wheel 40 rotatably thereon. The axle 110 is much longer in the axial direction than the corresponding width of the support arm through which it extends such that the wheel is mounted for sliding movement in the axial direction relative to the centre post 12 to vary the overall width between the wheels between a wider configuration shown by the left wheel in FIG. 7 and a narrower configuration shown by the right wheel in FIG. 7. The wider configuration provides greater stability; however, the narrower configuration is more compact for transport and storage. A set screw 116 is threaded into a bore in each support arm 42 so that the inner end of the set screw is in alignment with the wheel axle. The set screw can thus be loosened to allow the wheel axle to be readily slidable between the narrow and wider configurations or tightened to fix the position of the wheel axle relative to the support arm at any one of a plurality of different axial positions between the narrow and wider configurations.

With reference to FIG. 8, the seat 54 is again supported on a support arm 50 which is pivotally received at an inner end between the parallel plates 48 which are rotatably supported on the centre post 12 similarly to the previous embodiment. Optionally, the pair of collars 46 may be replaced by a single sleeve rotatably supported on the centre post 12 in which the sleeve spans the full height of the seat assembly between the bottom edge of the lower collar 46 and the top edge of the upper collar 46 shown in the figures. Although not shown in FIG. 8, a single second latch pin 60 is again provided to retain the seat support arm 50 latched in the stored transport position. The embodiment of FIG. 8 differs from the previous embodiment in that a pair of the first latch pins 58 are provided in which the two first latch pins 58 are supported on the two parallel plates 48 respectively for selective engagement into corresponding latching apertures in the opposing sides of the support arm to provide redundancy in supporting the seat support arm 50 in the working seated position. Similarly to the previous embodiment, each first latch pin 58 incorporates a spring therein which biases the latch pin into an engaged and latching position relative to the seat support arm 50.

To assist in retaining the latch pins in a released position, each first latch pin 58 is provided with a retainer bar 118 that is pivotally supported on the respective plate 48 so as to be pivotal between an engaged position in which a lug 120 at a first end of the retainer bar is received between the first latch pin 58 and the corresponding plate 48 to prevent the first latch pin 58 from being biased into the latched position thereof, and a disengaged position in which the lug at the first end of the retainer bar does not interfere with movement of the corresponding first latch pin 58 between the released and latched positions thereof. An opposing second end 122 of the retainer bar protrudes downwardly below the bottom edge of the corresponding plate 48 in the engaged position. In this instance a corresponding lug may be provided on the support arm which engages the second end of the retainer bar 118 as the support arm approaches the stored transport position thereof to automatically pivot the retainer bar from the engaged position to the disengaged position thereof by the engagement of the support arm with the second end of the retainer bar. The retainer bar is pivotally coupled to the corresponding support plate 48 at an intermediate location spaced inwardly from each of the first and second ends of the retainer bar.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A shooting stand for supporting a user and a gun on a ground surface, the shooting stand comprising:
   a center post having a longitudinal axis extending between a bottom end of the center post and an opposing top end of the center post;
   a plurality of legs extending longitudinally between respective inner ends of the legs pivotally coupled to the center post adjacent the bottom end of the center post and respective outer ends of the legs;
   the legs being pivotal between a collapsed position extending upwardly from the inner ends alongside the center post and an extended position extending radially outwardly from the center post at a downward slope towards the outer ends which are adapted to be supported on the ground surface;
   a gun support assembly supported on the center post in proximity to the top end of the center post which is adapted to support the gun thereon;
   the gun support assembly being pivotal relative to the legs about the longitudinal axis of the center post;
   a seat assembly supported on the center post at an intermediate location between the gun support assembly and the inner ends of the legs, the seat assembly comprising a seat which is adapted to support the user thereon;
   the seat assembly being pivotal relative to the legs about the longitudinal axis of the center post; and
   a pair of wheels supported on the shooting stand which are adapted to remain fixed in position relative to the center post as the legs are movable relative to the wheels and the center post between the collapsed position of the legs in which the wheels support the shooting stand for rolling movement along the ground surface and the extended position of the legs in which the wheels are supported spaced above the ground surface and prevented from engaging the ground surface by the legs;
   wherein the gun support assembly comprises:
      a pivot frame which is pivotally coupled to the center post so as to be pivotal relative to the center post about an axis lying perpendicular to the longitudinal axis of the center post;
      a gun support arm coupled to the pivot frame so as to be pivotal with the pivot frame relative to the center post between a collapsed position of the gun support arm alongside the center post and an extended position of the gun support arm extending radially outward from the center post; and
      a gun support cradle supported on the gun support arm which is adapted to receive the gun of the user cradled therein and which is adjustable in location along the gun support arm.

2. The shooting stand according to claim 1 wherein the wheels are supported on respective axles oriented in a lateral direction, the wheels being adjustable with the respective axles in lateral spacing relative to one another and relative to the center post.

3. The shooting stand according to claim 1 wherein the pair of wheels are spaced apart in a circumferential direction of the center post at opposing sides of one of the legs.

4. The shooting stand according to claim 3 wherein the legs are independently movable between the collapsed and extended positions thereof and wherein the pair of wheels are adapted to support the shooting stand for rolling movement along the ground surface when said one of the legs between the pair of wheels is in the collapsed position while the other legs remain in the extended position.

5. The shooting stand according to claim 3 wherein the plurality of legs comprises three legs which are spaced apart evenly from one another in the circumferential direction and wherein the seat is adapted to be received circumferentially between two of the legs in the collapsed position thereof at a location diametrically opposite from the other leg which is received circumferentially between the pair of wheels.

6. The shooting stand according to claim 1 further comprising a hinged brace associated with each leg respectively to selectively retain the leg in the extended position, each hinged brace comprising a first link pivotally coupled to the respective leg at an intermediate location on the leg and a second link pivotally coupled to each of the center post and the first link, the first and second links of each leg being folded alongside one another in the collapsed position of the leg and being joined end to end with one another under compression in the extended position of the leg, and wherein each hinged brace includes a latch pin operatively connected between the first and second links of the hinged brace so as to be arranged to selectively retain the hinged brace in the extended position of the leg.

7. The shooting stand according to claim 1 wherein the seat assembly comprises a seat collar supported for rotation about the center post and a seat support member upon which the seat is mounted and which is pivotally coupled to seat collar such that the seat is movable with the seat support member relative to the seat collar between a collapsed position of the seat in which the seat support member extends alongside the center post and an extended position of the seat in which the seat support member is supported to extend radially outward from the center post and the seat support member supports the seat thereon spaced radially outward from the center post.

8. The shooting stand according to claim 7 further comprising a first latching element carried on the seat collar so as to selectively engage the seat support member so as to be arranged to selectively retain the seat in the extended position and a second latching element carried on the seat collar so as to selectively engage the seat support member so as to be arranged to selectively retain the seat in the stored position.

9. The shooting stand according to claim 7 wherein the seat is received between two of the legs in the collapsed position of both the seat and the legs.

10. A shooting stand for supporting a user and a gun thereon, the shooting stand comprising:
a center post having a longitudinal axis extending between a bottom end of the center post and an opposing top end of the center post;
a plurality of legs extending longitudinally between respective inner ends of the legs pivotally coupled to the center post adjacent the bottom end of the center post and respective outer ends of the legs;
the legs being pivotal between a collapsed position extending upwardly from the inner ends alongside the center post and an extended position extending radially outwardly from the center post at a downward slope towards the outer ends which are adapted to be supported on a ground surface;
a gun support assembly supported on the center post in proximity to the top end of the center post, the gun support assembly including a gun support cradle which is adapted to support the gun thereon;

the gun support assembly being pivotal relative to the legs about the longitudinal axis of the center post;
a seat assembly supported on the center post at an intermediate location between the gun support assembly and the inner ends of the legs which is adapted to support the user thereon;
the seat assembly being pivotal relative to the legs about the longitudinal axis of the center post;
the seat assembly comprising (i) a seat adapted to receive the user seated thereon, (ii) a seat collar supported for rotation about the center post, and a (iii) seat support member upon which the seat is mounted and which is pivotally coupled to seat collar such that the seat is movable with the seat support member relative to the seat collar between a collapsed position of the seat in which the seat support member extends alongside the center post and an extended position of the seat in which the seat support member is supported to extend radially outward from the center post; and
a carrying handle mounted on the seat support member so as to protrude away from the center post in the collapsed position of the seat, the carrying handle being in proximity to a longitudinal center of the center post in the collapsed position of the seat.

11. The shooting stand according to claim 7 further comprising a shelf supported seat support member so as to be movable with the seat member relative to the center post, the shelf having an upper supporting surface lying perpendicularly to the center post.

12. The shooting stand according to claim 1 wherein the center post comprises:
a lower section formed by a bottom sleeve at a bottom end of the post upon which the legs are pivotally supported; and
an upper section longitudinally slidable within the bottom sleeve of the lower section upon which the gun support assembly is supported such that the gun support assembly is adjustable in height relative to the legs by longitudinally sliding the upper section relative to the lower section.

13. The shooting stand according to claim 12 wherein the seat assembly is supported on the lower section such that the gun support assembly is adjustable in height relative to the seat assembly by longitudinally sliding the upper section relative to the lower section.

14. The shooting stand according to claim 1 further comprising a user arm support member mountable on the pivot frame in an extended position to extend radially outward from the center post diametrically opposite the gun support arm in the extended position of the gun support arm and in a collapsed position extending alongside the gun support arm in the collapsed position of the gun support arm.

15. The shooting stand according to claim 14 wherein the user arm supporting member is mountable on the gun support arm in a first extended position offset laterally towards a first side of the gun support arm and in a second extended position offset laterally towards a second side of the gun support arm opposite the first side.

16. The shooting stand according to claim 1 wherein the gun support cradle is mountable on the gun support arm in a first position offset laterally towards a first side of the gun support arm and in a second position offset laterally towards a second side of the gun support arm opposite the first side.

17. The shooting stand according to claim 1 further comprising a brace member operatively connected between the gun support arm and the center post in the extended position of the gun support arm which includes a screw member arranged such that rotation of the screw member about a longitudinal axis of the screw member will vary an effective length of the brace member to vary an angular orientation of the gun support arm relative to the longitudinal axis of the center post, the brace member being readily releasable from one of the gun support arm and the center post whereby the gun support arm is pivotal into the collapsed position only when the brace member is released.

18. A shooting stand for supporting a user and a gun thereon, the shooting stand comprising:
   a center post having a longitudinal axis extending between a bottom end of the center post and an opposing top end of the center post;
   a plurality of legs extending longitudinally between respective inner ends of the legs pivotally coupled to the center post adjacent the bottom end of the center post and respective outer ends of the legs;
   the legs being pivotal between a collapsed position extending upwardly from the inner ends alongside the center post and an extended position extending radially outwardly from the center post at a downward slope towards the outer ends which are adapted to be supported on a ground surface;
   a gun support assembly supported on the center post in proximity to the top end of the center post which is adapted to support the gun thereon;
   the gun support assembly being pivotal relative to the legs about the longitudinal axis of the center post;
   a seat assembly supported on the center post at an intermediate location between the gun support assembly and the inner ends of the legs which is adapted to support the user thereon;
   the seat assembly comprising a seat adapted to receive the user seated thereon, and a seat support member pivotally coupled relative to the center post upon which the seat is mounted, the seat support member being pivotal relative to the center post between a collapsed position of the seat in which the seat support member extends alongside the center post and an extended position of the seat in which the seat support member is supported to extend radially outward from the center post and supports the seat thereon spaced radially outward from the center post; and
   the gun support assembly comprises:
      a pivot frame which is pivotally coupled to the center post so as to be pivotal relative to the center post about an axis lying perpendicular to the longitudinal axis of the center post;
      a gun support arm coupled to the pivot frame so as to be pivotal with the pivot frame relative to the center post between a collapsed position of the gun support arm alongside the center post and an extended position of the gun support arm extending radially outward from the center post; and
      an inner gun support cradle and an outer gun support cradle commonly supported on the gun support arm, the inner and outer gun support cradles being adapted to receive the gun of the user cradled therein;
      the inner and outer gun support cradles being pivotal together with the gun support arm between the extended position in which the inner and outer gun support cradles are supported at different distances along the gun support arm from the center post in a common direction along the gun support arm from the center post and the collapsed position.

19. The shooting stand according to claim 18 in which both the inner and outer gun support cradles are supported on the gun support arm so as to be positioned below the top end of the center post in the collapsed position.

* * * * *